March 29, 1932.  M. F. BATES  1,851,536
DIRECTIONAL GYROSCOPE
Filed April 11, 1923  2 Sheets-Sheet 1
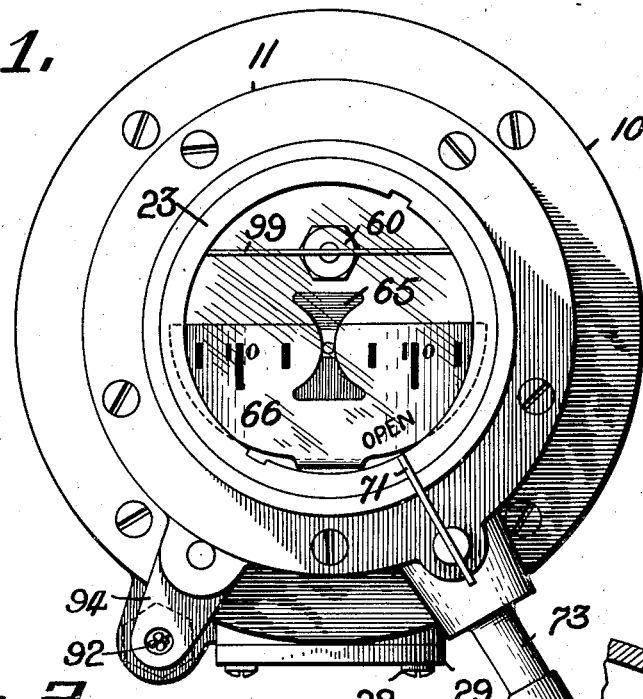
Fig. 1.
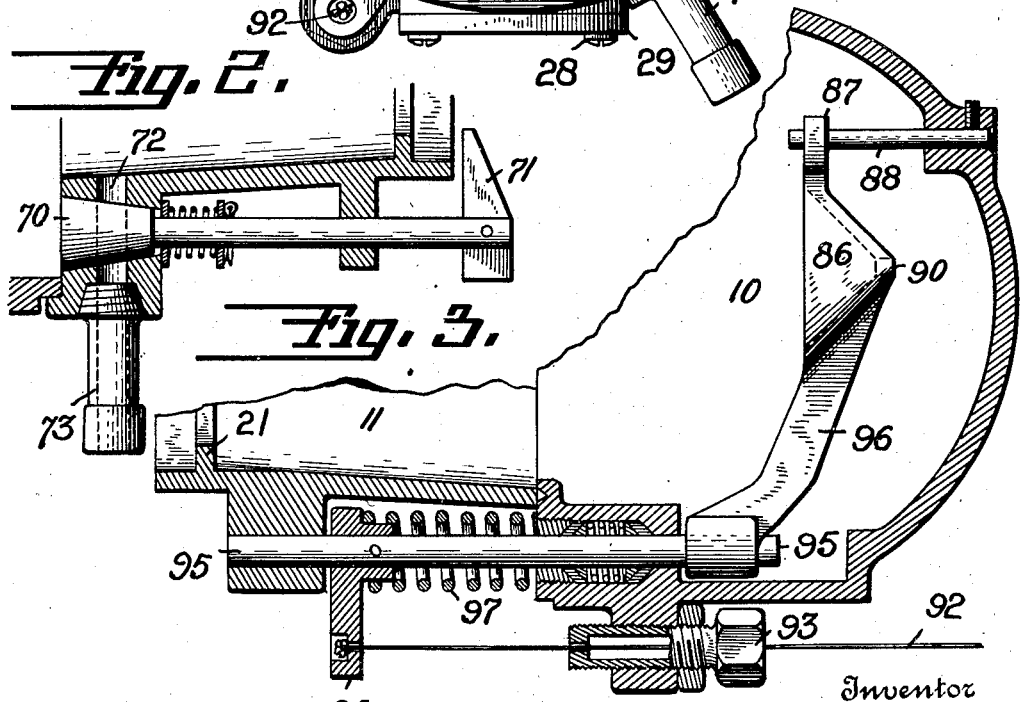
Fig. 2.
Fig. 3.
Inventor
Mortimer F Bates
By his Attorney
Herbert H. Thompson March 29, 1932.　　M. F. BATES　　1,851,536

DIRECTIONAL GYROSCOPE

Filed April 11, 1923　　2 Sheets-Sheet 2

Inventor
Mortimer F. Bates
By his Attorney
Herbert H. Thompson

Patented Mar. 29, 1932

1,851,536

UNITED STATES PATENT OFFICE

MORTIMER F. BATES, OF BROOKLYN, NEW YORK, ASSIGNOR, BY MESNE ASSIGNMENTS, TO SPERRY GYROSCOPE COMPANY, INC., A CORPORATION OF NEW YORK

DIRECTIONAL GYROSCOPE

Application filed April 11, 1923. Serial No. 631,355.

This invention relates to course-indicating devices for dirigible craft and is particularly adapted for use upon aircraft to indicate deviations from a predetermined straight course. Although the device may be used in ordinary flying to aid the pilot in maintaining a predetermined course, my invention is especially designed for use upon aircraft which are called upon to fly at times under conditions of poor visibility and also upon aircraft engaged in bombing. In bombing operations, the most important period of time is the last five minutes or less of approach to the target. During this short period, among other requirements, the bombing plane must be steered in as nearly a straight line as possible. For this purpose I provide means for indicating to the pilot whether the craft is traveling a straight course or deviating therefrom, in order that he may correct for such deviation by prompt rudder movement.

A further object is to provide an instrument of the type described which will not only indicate deviation from a straight course, but also the extent of such deviation and which, therefore, is especially useful in blind flying or doing maneuvers when the magnetic compass is of little value.

In a bombing operation, while the object of attack or target is some distance away or out of range, extra careful steering is not necessary, the pilot merely operating his aircraft in the general direction of the target and maintaining his position in the formation if his aircraft is one of several. Until the craft approaches the target, therefore, the course-indicating instrument need not be used. This invention therefore provides means for rendering the instrument ineffective until the craft approaches the target.

The bomber, or observer, from his post in the forward cockpit is in a position to determine when the time for extra careful steering has arrived. This invention has for a further object the provision of means whereby the bomber from his observing position may render the instrument effective or ineffective. This instrument may therefore be termed a pilot director, since the bomber by rendering the device effective or ineffective indicates to the pilot when the heading of the aircraft at that moment is or is not to be maintained and the consequent necessity for extra careful or only ordinary careful steering.

It is a further object of this invention to employ a gyroscope with three degrees of freedom in the pilot director device for indicating lateral deviation of the aircraft. This gyroscope may be termed the pilot director gyro or merely a directional gyroscope.

A further object of this invention is the provision of a second pointer acting in conjunction with a fixed cross-wire for indicating and thereby informing the pilot of any change of the aircraft with respect to the horizontal at the moment the director gyro was made effective by the bomber or observer; for at the moment of release this second pointer will lie directly behind and in line with the cross-wire. When the director gyro is made effective and the aircraft is deflected upwardly, the end of the pointer will appear above the cross-wire and if deflected downwardly, it will appear below the cross-wire.

I am aware that there are instruments that perform this service known as inclinometers, but I have combined this function of indicating deflection of the aircraft in a vertical plane with that of indicating deflection in a horizontal plane, i. e., the longitudinal attitude of the craft so that at the moment the gyro is made effective, the pilot has but to focus his attention upon only one instrument.

A further object of this invention is the provision of air-driving means for the rotor of the gyroscope designed to apply its power to the rotor without developing any parasitic reaction tending to precess the gyro about its vertical axis. For this purpose, I provide a plurality of air-jets positioned substantially symmetrically above and below the axis of rotation of the rotor and symmetrically above and below a line passing through the horizontal axis or trunnions of the inner gimbal ring, so that a plurality of torques are set up in opposite directions and of equal magnitude at such times as the gyro axis may be tilted with respect to the vertical ring, at which time the plane of rotation of the rotor is at a small angle to the plane of the vertical ring. Any tendency of the gyroscope to precess about a vertical axis in one direction is neutralized by the equal tendency to precess in the opposite direction. I have accomplished this result with little opportunity for air leakage, by making the air passageway arm which communicates with the plurality of air nozzles a part of the vertical ring so that but one air seal is required at the lower trunnion of the vertical ring.

A further object of this invention is the provision of an instrument having the characteristics described and adapted to be mounted upon the dash or instrument-board of a dirigible craft so that only the indicating face is exposed.

In the accompanying drawings:

Fig. 1 is a front elevation of a device embodying my invention.

Fig. 2 is a section taken substantially through the longitudinal axis of the air valve.

Fig. 3 is a section taken substantially through the locking or centralizing mechanism.

Figure 4:
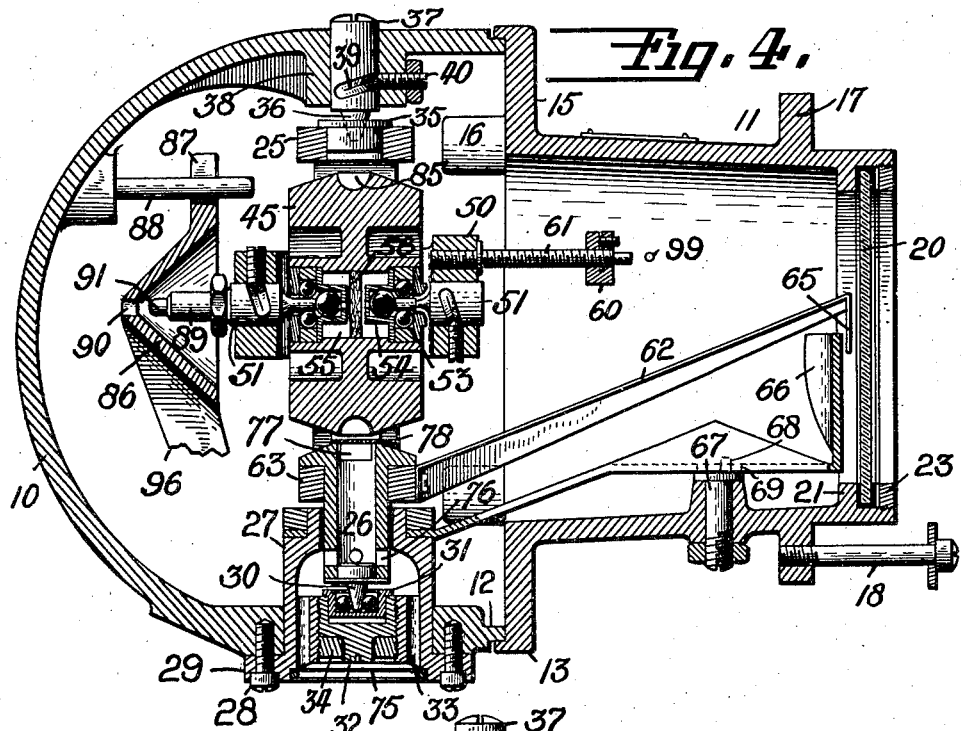
Fig. 4 is a vertical fore and aft section through the device shown in Fig. 1.
Figure 5:
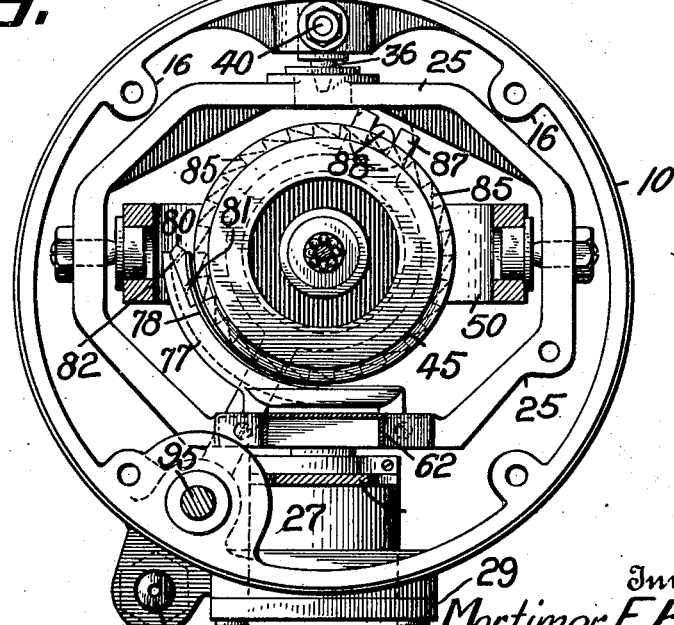
Fig. 5 is a vertical section taken in substantially the plane of the forward face of the rotor in Fig. 4.

Referring to the drawings, the device consists of a casing formed in two parts, a forward portion 10 adapted to enclose the major part of the operating mechanism and a rear portion 11 adapted to extend through the dash-board of a dirigible craft and enclosing the indicating mechanism. The parts 10 and 11 may be connected by means of cooperating flanges 12, 13, and by screws passing through wall 15 of member 11 and through lugs 16 formed adjacent the rearward edge of the casing 10. Near its rearward end, the portion 11 is provided with a flange 17 adapted to abut against the under (or forward) side of the dash-board, the extreme rearward end of portion 11 extending through the dash-board to which it may be fastened in any suitable and usual manner, as by bolts 18 extending into flange 17. The rear end of portion 11 may be closed by a transparent plate or window 20 abutting against an internal flange 21 on portion 11 and held in position by a threaded locking ring 23.

Within the portion 10 there is mounted for movement about a vertical axis a ring 25. At its lower end there is formed thereon a hollow trunnion 26 operating in a bearing very close to, but not in contact with the cylindrical wall of this bearing 27 secured in the portion 10 as by screws 28 passing through a flange 29 formed on the outer end of said bearing and engaging portion 10. In the lower end of trunnion 26 there is fixed a short journal 30 mounted in an anti-friction bearing in a cup 31 carried by a plug 32 threaded into the central portion of part 27. A series of air passages are drilled about this central portion, two of which appear at 33. The bearing 31 may be adjusted vertically to take up end play in the bearing by screwing plug 32 upwardly or downwardly in part 27, and locking the plug in adjusted position by a lock nut 34 also threaded into part 27. At its other end ring 25 is provided with an anti-friction ball bearing 35, into which fits a journal 36 at the end of a stem 37, engaging with bearing 35. Said stud is supported in a hub 38 formed on portion 10. The stem is provided with a spiral groove 39 into which fits a screw 40 passing through hub 38 to lock the stem in adjusted position. By loosening screw 40, stem 37 may be operated vertically, to take up end play. Since both bearings of ring 25 may be operated vertically, the ring may be properly centralized or otherwise adjusted vertically.

Within ring 25 is pivotally mounted on a horizontal axis, a ring 50 which is provided with adjustable bearings 51. The axis of said bearings is horizontal at right angles to the axis of rotation of ring 50. Upon bearings 51 is mounted the rotor 45 in anti-friction bearings 53 held in position by plates 54 within a cavity 55 in the rotor. Said cavity may be filled with oil and provided with an absorbent pad 56. Each plate 54 is provided with an opening through which the oil may pass to lubricate the anti-friction bearings.

The detailed description of the mounting of the gyroscope is to be taken merely as illustrative of one actual suitable construction, but it is to be understood that the invention is not limited to the details thereof.

The gyroscope is thus mounted with three degrees of freedom and as such is subject to an apparent precession of about 15° an hour, due to the earth's rotation. To compensate for this apparent precession, there is mounted upon ring 50 a weight 60 adjustable upon a threaded stem 61 secured to the ring 50 in substantially the vertical plane of the axis of bearings 51. By properly adjusting weight 60 for a given latitude and other factors there is induced a precessional force equal and opposite to that due to the earth's rotation so that the gyroscope will maintain a fixed and unvarying position with respect to the earth.

If now there is fixed to the outer ring 25 a pointer 62 extending rearwardly to the window 20 and fixed to said ring 25 as by a collar 63 engaging trunnion 26, said pointer will be fixed in position relative to the earth. The casing 10, 11 moves with the craft, so that any deviation from a straight course in azimuth will be apparent from relative movement between the pointer and the casing. The pointer may terminate in an index 65 adjacent the window 20, said pointer cooperating with a circular scale 66 fixed in any suitable manner, as upon bearing 27 and supported as upon stud 67 which has an eccentric stud 68 on its upper face engaging with a slot 69 in the scale member, by which the pointer and scale can be adjusted to zero. The scale may be graduated to indicate to the pilot the degree of deviation from the straight course.

For driving the gyroscope the passage of the craft through the air may be utilized. For this purpose there may be provided in the casing a valve 70 which may be operated by a rearwardly-extending handle 71 to control an air passage 72 to which is connected a tube 73. Connected to tube 73 is a Venturi-tube (not shown) by suitable piping as in the patent to Elmer A. Sperry, No. 1,407,491, granted February 21, 1922. As the craft travels through the air, suction is created at the narrow part of the Venturi-tube to which tube 73 is connected. The air within the casing 10, 11 is drawn out and other air is drawn in through the open end of bearing 27. Said open end may be fitted with a filtering screen 75 to keep out foreign matter. The air passes through air screen 75 and through passages 33, through openings 76 in the lower end of trunnion 26, into the trunnion and thence into a channel bar 77 adjacent the rotor and conforming to the curvature thereof. The bar is covered by a plate 78 so that the air is confined within the tube thus formed. The tube ends approximately with the horizontal plane of the rotor axis and is provided with a block 80 which may be fixed to plate 78 to close the upper end of the tube. The block is substantially wedge-shaped so that for the greater part of its length it is smaller than the interior of the tube so that air can get behind it. The block is provided with two nozzles 81 and 82, nozzle 81 extending through the block and cover-plate while nozzle 82 extends through the block and terminates above the end of the cover plate. Both nozzles are directed upwardly against the periphery of the rotor which is formed with a plurality of buckets 85. The nozzles are so positioned that nozzle 81 will cause a stream of air to strike the buckets a predetermined distance below the rotor axis while nozzle 82 will cause a stream of air to strike the buckets substantially the same distance above the rotor axis. In this manner any tendency to induce precession due to the torque exerted by the air from one of said nozzles striking the rotor will be neutralized by an equal and opposite tendency to precession induced by the other nozzle. Any number of nozzles may be employed so long as the component of the forces applied above the rotor axis is equal to the component of the forces applied below said axis, and the distance above the axis at which the component force is applied is the same as the distance below the axis at which the other component force is applied. It should also be understood that other means may be employed for supplying air to the rotors, and that the same principles apply where some other force than air is employed. This neutralizing action described is obtained and required only at such times as the gyro axis is tilted from its right angle position with respect to the vertical ring.

As hereinbefore set forth, it is not absolutely necessary to utilize the direction indicator except during the final few minutes of flight toward the target. To enable the bomber to render the directive gyro effective when the target is being approached and to hold said gyro ineffective at all other times, there is provided a locking device which comprises a centralizing locking cone 86 having a fork 87 formed therein engaging a fixed guide-rod 88 to constrain said cone against rotary movement and confine it to translating movement toward and away from an extension 89 formed on the end of one of the bearings 51. The cone is provided with a hole 90 in its vertex adapted to engage over the end 91 of extension 89 to cause the gyroscope and casing to move integrally. The valve 70 may also be turned off. In this condition the director gyro is ineffective. The pilot notices this condition because of the fact that index 65 does not oscillate relative to scale 66. When the craft approaches the target, the bomber moves the cone 86 out of engagement with extension 89 so that the gyro and casing have independent movement. This is at once noticeable to the pilot because of the oscillation between index 65 and scale 66, and he thereafter steers carefully to maintain the craft accurately on its straight course.

For enabling the bomber to operate the locking device from a point of the craft removed from the pilot there is provided a Bowden wire 92 passing through a guide 93 on the forward part of the casing and connected to a member 94 pinned to a shaft 95 slidable in the portions 10, 11 of the casing. One end of said shaft is connected to an arm 96 formed integral with cone 86, so that by pulling upon wire 92 the locking cone may be drawn out of engagement with the gyro to release the latter. This is done by the bomber as the craft approaches the target. The end of wire 92 may be connected to an operating handle adjacent the bomber's position. The gyro is normally rendered ineffective by means of a spring 97 normally pressing shaft 95 in a direction to cause cone 86 to engage extension 89.

In the final few minutes when the craft is approaching the target, it is necessary not only to cause the craft to maintain a straight course, but it must also maintain its horizontality. The director gyro may be utilized to indicate horizontality also, since it maintains a fixed position relative to the earth. For this purpose weight 60 may be utilized as an indicator cooperating with a cross-wire indication 99 which can be seen through the window 20. If the pointer 60 departs from line 99 in a vertical direction, horizontality no longer exists, the attitude of the longitudinal axis of the craft is incorrect and the pilot proceeds to right the machine accordingly. Pointer 60 also furnishes a valuable indication of when to centralize or cage the gyroscope. If the pointed 60 is near the cross wire 99 and the plane is otherwise horizontal, the aviator will know that the gyro is properly functioning. On the other hand, if the pointer 60 disappears from the field of view of the window he will know that the gyroscope is so inclined as to be useless and will, therefore, centralize the gyroscope.

In operation, when the bomber sees that the craft is within a few minutes run of the target and is heading straight for the target, he pulls upon wire 92 to render the director gyro effective. Thereafter the pilot maintains that straight course at the same level of flight by following the indicator. When used for normal flying, the gyroscope may be allowed to run free the greater part of the time, but it should be reset by caging the same periodically to keep it from straying too far about either its horizontal or vertical axis.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relation described, some of these may be altered and others omitted, without interfering with the more general results outlined, and the invention extends to such use.

Having herein described my invention what I claim and desire to secure by Letters Patent, is, 1. In an air driven gyroscope, a rotor, means for mounting the same for turning about a vertical axis and for oscillation about a horizontal axis, and spinning means for said rotor comprising a nozzle for directing a stream of air against the periphery of said rotor a slight distance below said horizontal axis to rotate the same and adapted when the rotor is inclined with respect thereto to cause precession of the gyroscope in one direction, a second nozzle for directing a stream of air a slight distance above said horizontal axis of said rotor to rotate the same and adapted when said rotor is inclined as aforesaid to cause precession of the gyro in the opposite direction whereby deflection of said gyroscope by the driving means is avoided.

2. In a flight indicator for aircraft, a gyroscope mounted for oscillation about a horizontal axis, means for mounting the same for freedom about the vertical axis, an enclosing casing for said gyroscope, an arm secured to said last-named means and extending forwardly, a vertically positioned azimuth indicator on said arm, a forward extension on said casing for enclosing said arm and permitting only limited movement thereof, a stationary indicator therein cooperating with the first named indicator, a forward window through which said indicators are readable, and means for centralizing the gyroscope within said casing at will.

3. In a flight indicator for aircraft, a gyroscope mounted for oscillation about a horizontal axis, means for mounting the same for freedom about the vertical axis, an enclosing casing for said gyroscope, an arm secured to said last-named means and extending forwardly, a vertically positioned azimuth indicator on said arm, an indicator of the horizontal also secured to said gyroscope and extending forwardly, a forward extension on said casing enclosing said arm and horizontal indicator and permitting only limited movement of each, a forward window on said extension through which both of said indicators are readable, and means for centralizing the gyroscope about both its horizontal and vertical axes at will.

4. A flight indicator for aircraft comprising a gyro rotor having buckets in the periphery thereof, a normally horizontal ring in which said rotor is journalled, a vertical ring in which said horizontal ring is journalled for oscillation about a horizontal axis at right angles to the rotor axis, a sealed casing in which said vertical ring is journalled for turning about a vertical axis, a hollow journal for said vertical ring, an arm leading therefrom having a bore partially around the periphery of the rotor which has a plurality of spaced nozzles positioned adjacent the axis of said horizontal ring, and means for continuously exhausting the air from said casing.

5. A flight indicator for aircraft comprising a gyro rotor having buckets in the periphery thereof, a normally horizontal ring in which said rotor is journalled, a vertical ring in which said horizontal ring is journalled for oscillation about a horizontal axis at right angles to the rotor axis, a casing in which said vertical ring is journalled for turning about a vertical axis, a hollow journal for said vertical ring, an arm leading therefrom having a bore partially around the periphery of the rotor which has a plurality of spaced nozzles positioned near the axis of said ring so that the jets strike the wheel on each side of the axis, and means for supplying air to said nozzles at a pressure superior to that of the atmosphere within said casing.

6. In gyroscopic directional apparatus, a rotor, means for mounting it for turning about a vertical axis, means supported therein for mounting it for oscillation about a horizontal axis, and spinning means for said rotor, comprising a pair of fluid nozzles, a mounting therefor independent of said second mounting means, said nozzles being both arranged on the same side of the gyroscope so that the fluid emerging therefrom strikes the rotor slightly above and slightly below the horizontal axis of oscillation thereof.

In testimony whereof I have affixed my signature.

MORTIMER F. BATES.